United States Patent [19]

Butts et al.

[11] Patent Number: 5,325,249

[45] Date of Patent: Jun. 28, 1994

[54] DIFFERENTIATION OF MEDIA TYPES VIA LEADER BLOCK CHARACTERISTICS

[75] Inventors: Ralph L. Butts, Boulder; Michael L. Leonhardt, Longmont; Charles A. Milligan, Golden, all of Colo.

[73] Assignee: Storage Technology Corporation, Louisville, Colo.

[21] Appl. No.: 962,948

[22] Filed: Oct. 19, 1992

[51] Int. Cl.⁵ .............................................. G11B 15/67
[52] U.S. Cl. ................................ 360/95; 369/36; 242/195; 226/92
[58] Field of Search ................ 360/95, 94; 369/36, 369/77.2; 242/195; 226/91, 92

[56] References Cited

U.S. PATENT DOCUMENTS

| | | | |
|---|---|---|---|
| 4,832,284 | 5/1989 | Inoue | 360/95 |
| 4,852,825 | 8/1989 | McGee et al. | 242/195 |
| 4,914,421 | 4/1990 | d'Alayer de Costermore d'Arc et al. | 369/77.2 |
| 5,058,100 | 10/1991 | Yoshii | 369/36 |
| 5,155,639 | 10/1992 | Platter et al. | 242/195 |

*Primary Examiner*—A. J. Heinz
*Assistant Examiner*—George J. Letscher
*Attorney, Agent, or Firm*—Duft, Graziano & Forest

[57] ABSTRACT

Data storage elements that present uniform external dimensions but contain media of varying types and characteristics provide variable data storage and/or recording characteristics. To differentiate between the various media that can be used within the common form factor, each data storage element is equipped with a leader block, the tape threading slot of which is uniquely dimensioned to correspond to the media contained within the data storage element.

10 Claims, 5 Drawing Sheets

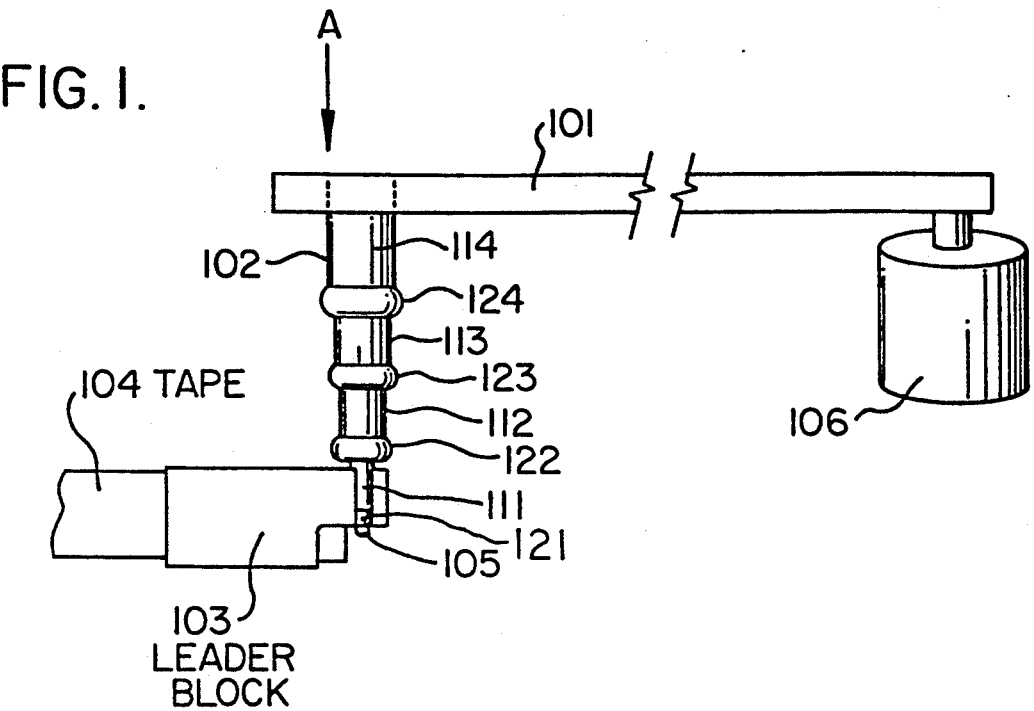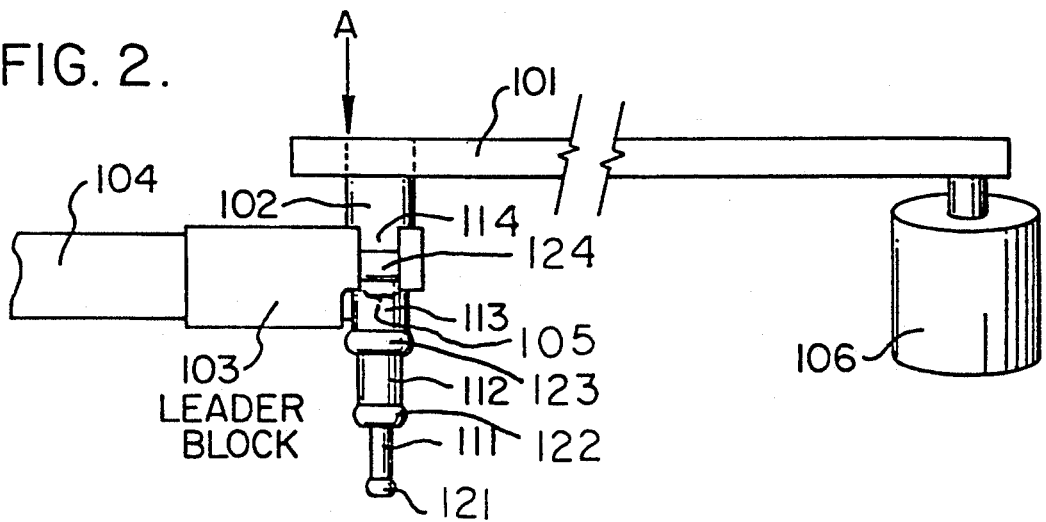

DIFFERENTIATION OF MEDIA TYPES VIA LEADER BLOCK CHARACTERISTICS

FIELD OF THE INVENTION

This invention relates to data storage systems and, in particular, to system for differentiating among a plurality of types of data storage elements that have substantially uniform external housing dimensions but contain different types of media therein.

PROBLEM

It is a problem to provide data storage facilities that are flexible enough to be responsive to variations in function, performance and capacity of a particular computer installation. Existing data storage subsystems are typically not adaptable and are based on a single type of media that has predetermined mechanical, electrical and operational constraints, and specific interface mechanisms and protocols. A computer system user must, therefore, purchase a mixture of data storage subsystems to be able to match the data storage capabilities of the media with the nature of the data and the processing requirements of the data being stored on the media. Often, the cost of configuring a multiplicity of incompatible data storage subsystems is prohibitive.

The decision to make a transition from one media to another is generally prompted by the need to change one of the primary data storage subsystem characteristics, such as volumetric efficiency of data stored per unit of space occupied, access performance (load, search, transfer times), cost, reliability, archival data storage capabilities (shelf life, environmental hardness, format standards), or management (media interchange, automated handling, catalogue systems, physical facilities). For removable media types, the effects of such transitions are exacerbated by the use of large automated library systems, such as the 4400 Automated Cartridge System manufactured by Storage Technology Corporation, that stores thousands of the industry standard 3480-type magnetic tape cartridges for an associated plurality of cartridge tape drives, but require the user to commit to a significant investment in these 3480-type tape cartridges and cartridge tape drives. However, a library system can also handle a family of uniform form factor data storage elements which contain different types of media. These various media types provide a range of data storage and/or recording characteristics to enable the user to use multiple types of media in an automated library system or a manually operated media storage and retrieval system to provide a multiplicity of operating and storage characteristics.

However, since the exterior dimensions of all of the data storage elements are uniform, there arises a problem of differentiation among media types. There exists a potential for damage to either the media contained within the data storage element or to mechanisms in the drive element if the media is incompatible with the selected drive element. Furthermore, with advances in recording and media mounting techniques among drive element, there is no longer a one-to-one correspondence of media types to drive element types.

SOLUTION

The above described problems are solved and a technical advance achieved in the field by the system for media differentiation for data storage elements having a common form factor. It is desirable to have a library system that can accommodate many different combinations of data storage elements and drive elements, such that particular media types can be keyed to operate with particular corresponding drive element types. Although there are many ways of identifying media types—such as machine readable labels or physical features on the exterior of the data storage element—all these systems are subject to error. None provides a positive, mechanical lock-out to ensure that the proper media can only be accessed by an appropriate drive element.

The preferred embodiment of this invention utilizes a magnetic tape cartridge such as the standardized 3480 type data storage element. This magnetic tape cartridge is characterized by its use of a leader block to load the magnetic tape media into a compatible tape drive. The tape threading arm mounting pin in the tape drive engages the leader block and removes it from the magnetic tape cartridge by the motion of the tape drive tape threading arm. The magnetic tape media is attached to the leader block and is pulled into the tape drive mechanism past the read/write heads along a predetermined tape threading path to a takeup reel.

The existing population of 3480-type magnetic tape cartridge media and compatible tape drives all utilize a slot of predetermined dimensions in the leader block and a compatible mounting pin in the tape drive as dictated by an ANSI standard. It is possible to enlarge the leader block slot such that existing tape drive mounting pins do not successfully engage the leader block and therefore are unable to load the magnetic tape media. Further, following such a failed engagement, the tape drive aborts its load cycle and ejects the magnetic tape cartridge for manual or automated retrieval. The leader block-mounting pin combination therefore forms the basis of a media differentiation system.

By enlarging the leader block slot in fixed increments, and providing a set of matching enlarged mounting pin sections in the tape drive, a series of media types within data storage elements and tape drives are created wherein all tape drives with mounting pins smaller than the leader block slots can not load the media. Conversely, tape drives with enlarged pins fail to engage leader blocks with smaller slots—as above, the tape drive responds to the mismatch by aborting its load cycle and ejecting the magnetic tape cartridge.

It is envisioned that tape drives can be compatible with multiple types of magnetic tape media, some of which are new and some of which are those presently in use. New media types (e.g. thinner tape substrates) might be damaged by old tape drives and their loading mechanisms, and therefore are manufactured with an appropriate change to the leader block aperture. However, the new tape drives might also be able to handle the old magnetic tape media without damage. In this case, the tape drive can be provided with a multidiameter mounting pin. Such a mounting pin would have a plurality of sections of varying diameter coaxially along its length. By positioning the compatible section of the mounting pin to engage the magnetic tape cartridge leader block, such a tape drive selectively loads varying types of magnetic tape. A tape drive so equipped would have a retry procedure such that if an attempted load failed, the mounting pin would be repositioned to present a different diameter section to the leader block and attempt another load cycle. In addition, by sensing if a load failure occurred from an undersized pin, or an oversized pin, the tape drive can more quickly make a decision to attempt a retry and know to position to a larger or smaller mounting pin section or know that further mounting pin size options are unavailable and identify the media as incompatible.

Although based upon a singe reel 3480-type magnetic tape cartridge system, differentiating between data storage elements having a common form factor is not limited to magnetic tape media. The data storage element can contain a variety of media types including tape, disk, and semiconductor. Where a non-tape media is utilized in the data storage element, the leader block serves to interconnect the particular media type with the storage device—this could be via opening an access port, mating a connector, etc.

BRIEF DESCRIPTION OF THE DRAWING

FIGS. 1 and 2 illustrate the overall architecture of the apparatus for differentiating media within data storage elements having a common form factor;

DETAILED DESCRIPTION

Existing removable media data storage and retrieval systems, whether manual or robotic, are predicated on the use of removable data storage elements of uniform external dimensions, internal structure, media and recording characteristics. A standarized data storage element can be used to present uniform external housing dimensions but enables the user to vary the contents to include a selection of media types used therein to provide variable data storage and/or recording characteristics. This enables the use of multiple types of media in an automated library system or a manually operated media storage and retrieval system, since all of the data storage elements contained therein have a common form factor. This capability enables the use of a diversity of drive elements connected to the computer system without having to have a corresponding diversity in media element handling systems.

Data Storage Element Housing Architecture

Figure 3:
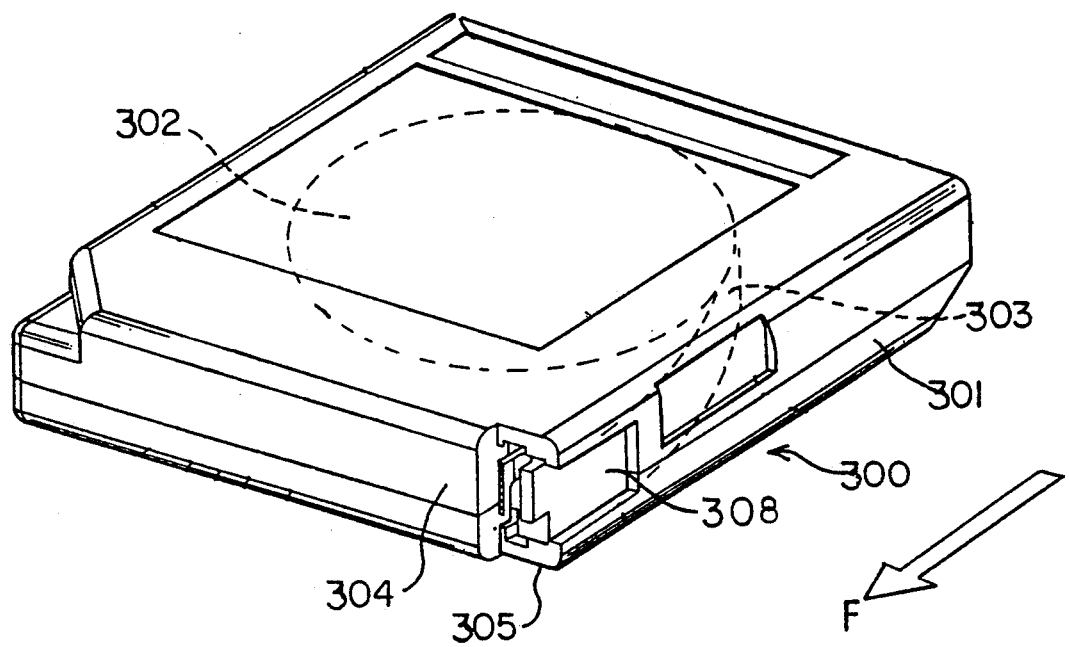
FIGS. 3 and 4 illustrate implementations of the universal data storage element.
Figure 4:
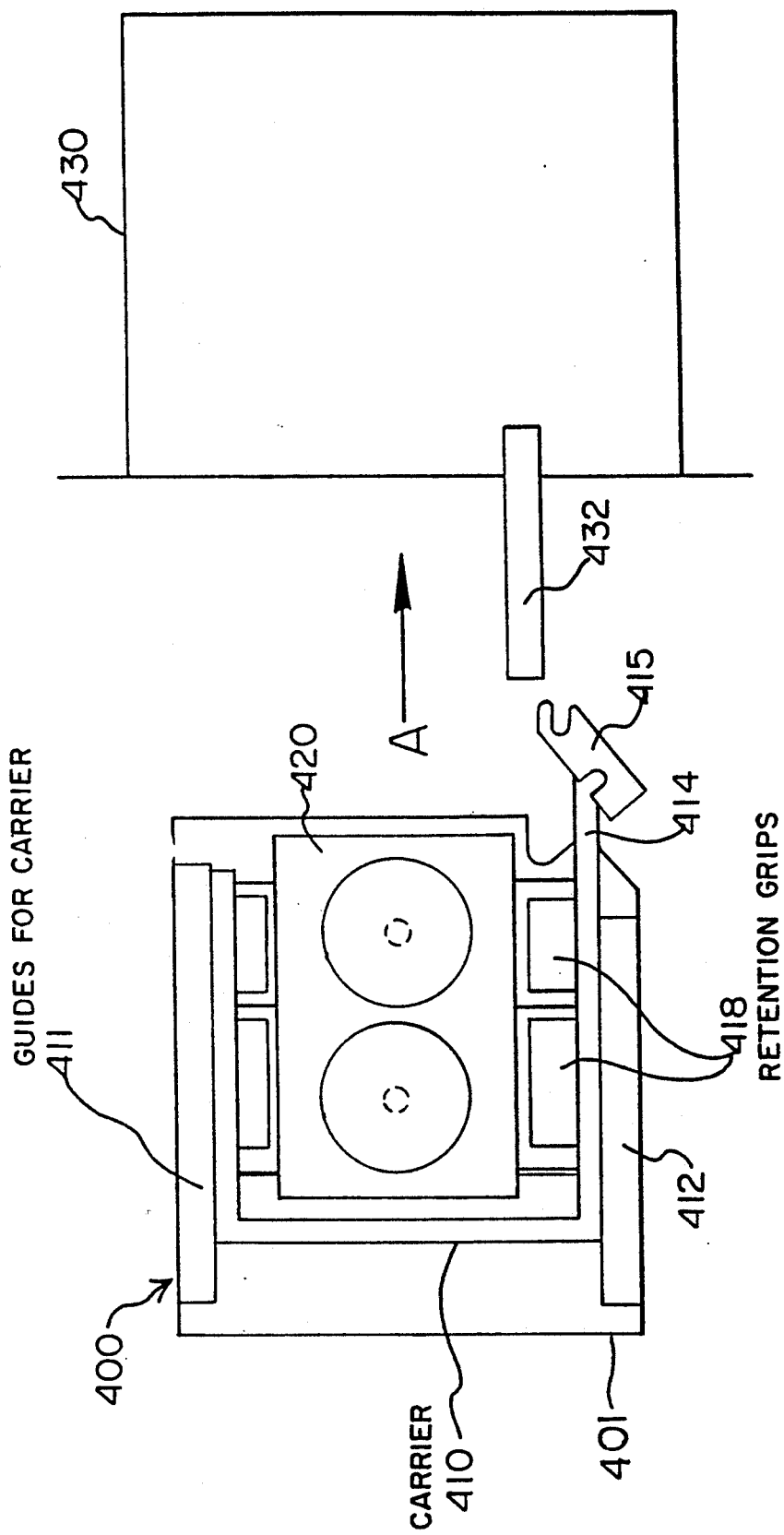

FIGS. 3 and 4 illustrate the overall architecture of a data storage element housing 300 and 400. In FIG. 4, data storage element 400 consists of an exterior housing 401 that substantially matches the industry standard IBM 3480-type magnetic tape cartridge in exterior dimensions and configuration. Within exterior housing 401, the multi-media data storage element 400 contains a carrier 410 which is slidably connected to a pair of guide rails 411, 412 which are affixed to the interior walls of exterior housing 401 on opposite facing interior walls thereof. Carrier 410 is extensible from a loaded position, wherein it is located fully within exterior housing 401 to a position exterior to housing 401.

In order to effectuate the movement of carrier 410, there are a number of implementations that are possible. As illustrated in FIG. 4, a leader block 415 can be used as an element to accomplish the carrier withdrawal function. This leader block 415 is affixed either directly to carrier 410 or to an extension arm 414 that is itself affixed to carrier 410 to provide a point of contact for a media withdrawal element 432 in the associated interface element 430. A mounting pin mechanism (not shown) in the interface element 430 receives leader block 415 and pulls carrier 410 with its associated media element 420 out of data storage element housing 401 by moving leader block 415 in the direction indicated by arrow A. Carrier 410 is of a configuration and dimension to support in a secure manner, via retention grips 418, the media element 420 that is housed within exterior housing 401. The media element 420 can be a two reel tape cassette as shown in FIG. 4, or any other self-contained element such as a disk drive, a solid state memory, optical disk, etc. The media element 420 is housed within the data storage element 400 and retrieved therefrom by the interface element 430 which provides an associated drive element (not shown) with the retrieved media element 420.

Magnetic Tape Cartridge

Figure 6:
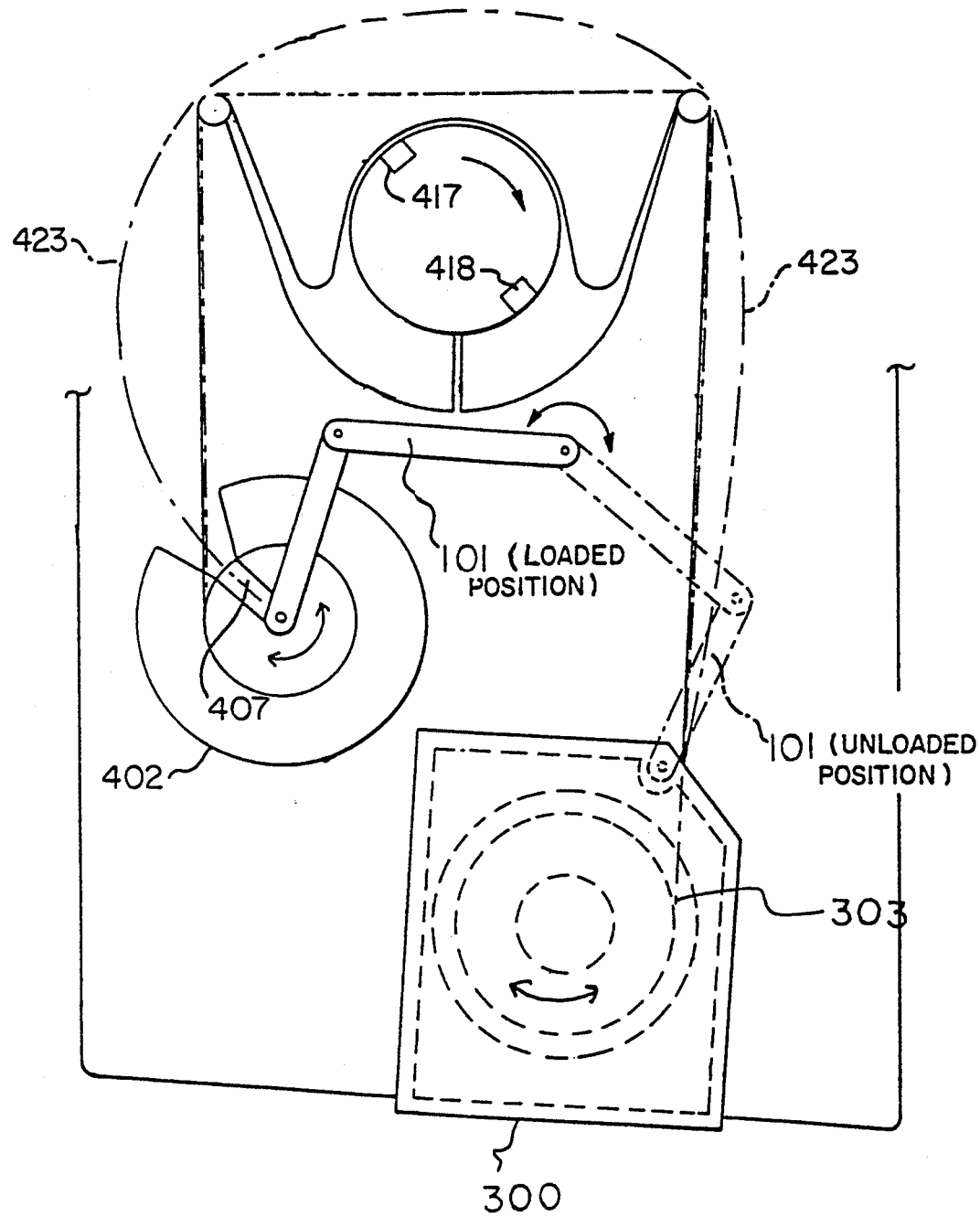
FIG. 6 illustrates the predefined tape path across read/write heads to a take-up reel.

FIG. 3 illustrates a second embodiment of the data storage element, used for tape media and showing a perspective view of a magnetic tape cartridge 300 that consists of an exterior housing 301 which has a front side 304, which includes an opening 305 through which a tape transport accesses the magnetic tape 303 contained therein. The magnetic tape cartridge 300 is inserted into the tape transport in direction F, front side 304 first. The magnetic tape cartridge 300 contains a single supply reel 302 on which the magnetic tape 303 is wound in a clockwise direction. Access to magnetic tape 303 is provided via a leader block 308 attached to one end of the magnetic tape 303 that is stored in the helical scan magnetic tape cartridge 300. FIG. 6 illustrates a predefined tape loading arm path 423 along which a single reel of magnetic tape 300 is drawn across the read/write area 417 and 418, toward and into slot 407 of the take up reel 402.

Media variations and Differentiation

At present, there is only one media type loaded into the commercially available 3480-type magnetic tape cartridge: a longitudinal one-sided magnetic tape. The introduction of a helical scan magnetic tape cartridge 300 now provides a variety of data storage characteristics for the magnetic tape media. The data storage characteristics can include data recording format (longitudinal or helical), tape dimensions (thick or thin/length of tape on reel), magnetic coating on the tape (iron-oxide or chromium dioxide or barium ferrite), write protection status, etc.

Figure 5:
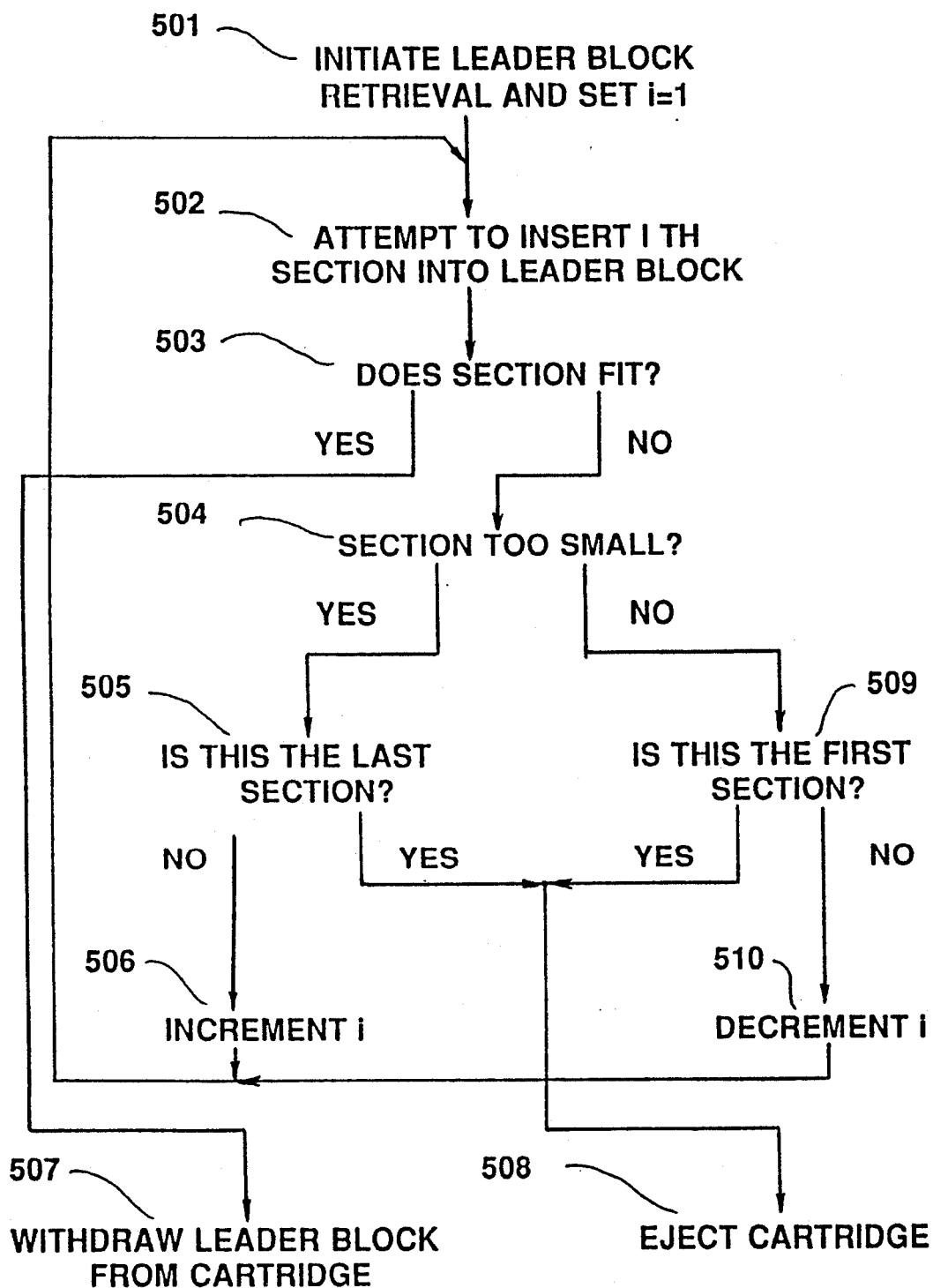
FIG. 5 illustrates in flow diagram form the operational steps taken to engage the leader block with the mounting pin.

FIGS. 1 and 2 illustrate the apparatus of the present invention while FIG. 5 illustrates in flow diagram form the operational steps taken by this apparatus to perform the media discrimination function. In particular, the loading arm 101 illustrated in FIGS. 1 and 2 is attached at one end to a positioning system 106 that functions to control the movement of the loading arm as described below. The loading arm 101 has attached at the distal end thereof a mounting pin 102 that consists of a plurality of coaxially aligned sections 111–114. Each of sections 111–114 are separated from the adjacent section via one of spacers 121–124. Leader block 103 illustrated in FIGS. 1 and 2 includes a mounting pin slot 105 of predetermined dimensions to match one of sections 111–114 on mounting pin 102. In operation, positioning system 106 activates loading arm 101 to insert mounting pin 102 into slot 105 in leader block 103 by moving mounting pin 102 in direction A. When the one of sections 111–114 that matches slot 105 is inserted therein, loading arm 101 can retrieve leader block 103 from the magnetic tape cartridge by pulling it out through the opening in the magnetic tape cartridge. Since the various magnetic tape cartridges have differing dimension slots 105 on leader block 103, mounting pin 102 on loading arm 101 contains a plurality of sections 111-114 if the associated tape drive is equipped to read and write data on a plurality of types of magnetic tape media. Thus, the mounting pin 102 illustrated in FIGS. 1 and 2 contains four sections 111-114 indicative of the fact that the associated tape drive can read and write on four different types of magnetic tape that is stored in the magnetic tape cartridge.

The flow diagram of FIG. 5 illustrates in flow diagram form the operational steps taken by the control system that activates positioning system 106 to cause loading arm 101 to insert mounting pin 102 into slot 105 of leader block 103 and to extract leader block 103 from the magnetic tape cartridge. At step 501, in response to a magnetic tape cartridge being mounted in the tape drive, the control circuit initiates the leader block retrieval operation by setting the variable i=1 for either incrementing or decrementing a known number of sections. At step 502, the control circuit activates positioning system 106 to attempt to insert ith section (section 111) into slot 105 of leader block as illustrated in FIG. 1. At step 503, the control circuit determines whether section 111 fits slot 105 by attempting to withdraw leader block 103 from the magnetic tape cartridge. If section 111 matches the dimensions of slot 105, the movement of leading arm 101 will cause mounting pin 102 to withdraw leader block 103 from the magnetic tape cartridge at step 507. If section 111 does not fit slot 105, processing advances to step 504 where the control circuit determines whether section 111 is too small to match the dimensions of slot 105. This is determined by positioning system 106 activating loading arm 101 to attempt to withdraw leader block 103 from the magnetic tape cartridge and having section 111 exit the side of slot 105 since the dimension of section 111 is smaller than the required dimensions 105. If this is the case, a determination is made at step 505 whether this section 111 is the last section of mounting pin 102. If it is, than there are no larger section remaining on mounting pin 102 to attempt to use in extracting leader block 103 from the magnetic tape cartridge and the tape is ejected at step 508. If however, at step 505 it is determined that this is not the last section of the mounting pin 102, the variable i is incremented at step 506 and processing returns to step 502 where the positioning system 106 is activated to repeat the attempt to retrieve leader block 103 from the magnetic tape cartridge. Processing continues until no further sections are available on mounting pin 102 and the magnetic tape is ejected at step 508 or one of the sections 111-114 of mounting pin 102 successfully matches 105 in leader block 103. A successful match is illustrated in FIG. 2 wherein sections 111-113 have been tested and found to be too small to match slot 105 and section 114 matches slot 105 and is inserted therein to enable loading arm 101 to withdraw leader block 103 from the magnetic tape cartridge.

If at step 504, the control circuit determines that the section is not too small and does not fit slot 105 as determined at step 503, processing advances to step 509 where it is determined whether this is the first section. If it is, then no remaining smaller sections are available on mounting pin 102 and mounting pin 102 will not match slot 105 in leader block 103, therefore the magnetic tape cartridge is ejected at step 508. If this is not the first section of mounting pin 102, then the variable i is decremented and a smaller diameter section of mounting pin 102 will next be used to attempt to match to slot 105 in leader block 103. This decrement function is accomplished at step 510 and processing then returns to step 502 where the mounting pin 102 is realigned by the action of positioning system 106 causing loading arm 101 to move in a direction opposite to that of arrow A to use the smaller section of mounting pin 102 to attempt to match slot 105. The process is repeated as described above until either the mounting pin sections have all been tried and no match occurs at which time the magnetic tape is ejected at step 508 from the tape drive or any one of sections 111-114 are discovered to match slot 105 and the loading arm 101 is able to successfully retrieve leader block 103 from the magnetic tape cartridge. It is an alternative configuration for loading arm 101 to include a plurality of loading pins 102, each having a different diameter, rather than a single coaxial multi-section mounting pin 102. These pins can be activated sequentially in a manner that is analagous to that described above for the single multi-section mounting pin 102.

SUMMARY

The use of leader blocks that include a slot having dimensions that are coded to match the type of media contained within the magnetic tape cartridge enable the tape drive to make use of a multi-segment mounting pin to define the ones of the plurality of different types of magnetic tape media that can be read and written by the magnetic tape drive without damage to the magnetic tape media or the tape drive. By sequentially testing each of the sections of the mounting pin in the slot in the leader block, the tape drive can determine whether there is a correspondence therein that enables the tape drive to load the magnetic tape from the magnetic tape cartridge into the tape drive. This coded mounting pin arrangement prevents inadvertent mismounting of the magnetic tape and inappropriate tape drive.

While a specific embodiment of this invention has been disclosed, it is expected that those skilled in the art can and will design alternate embodiments of this invention that fall within the scope of the appended claims.

We claim:

1. In a media drive that reads/writes data on a plurality of different types of data storage media, wherein one of said plurality of different types of data storage media is stored in a data storage element housing, and that has an opening in one end thereof for receiving a leader block connected to said data storage media for extracting said data storage media from said data storage element housing, said leader block having a media retrieval arm slot whose dimensions are coded to identify the one of said plurality of different types of data storage media that is contained within said data storage element, a data storage media identification apparatus comprising:

leader block retrieval member means having at least two sections, each of dimensions to mate with a corresponding media retrieval arm slot enabling said leader block retrieval arm means to retrieve a leader block for each of at least two types of said plurality of different types of data storage media;

means, responsive to a data storage element being loaded into said media drive, for sequentially inserting successive ones of said sections of said leader block retrieval member means into said media retrieval arm slot located on said leader block of said data storage element loaded into said media drive, when an incompatible one of said sections of said leader block retrieval member means fails to engage said media retrieval arm slot; and means, responsive to one of said sections of said leader block retrieval member means mating with said media retrieval arm slot located on said leader block of said data storage element loaded into said media drive, for retrieving said leader block from said data storage element loaded into said media drive.

2. The data storage media identification apparatus of claim 1 wherein said leader block retrieval member means includes:

cylindrical pin means, having a plurality of coaxially aligned sections, each having a different diameter, each said different diameter being matched for mating with said corresponding media retrieval arm slot located on said leader block.

3. The data storage media identification apparatus of claim 1 wherein said sequentially inserting means includes:

means, responsive to a data storage element being loaded into said media drive, for inserting one of said sections of said leader block retrieval member means having smallest dimension into said media retrieval arm slot located on said leader block of said data storage element loaded into said media drive.

4. The data storage media identification apparatus of claim 3 wherein said sequentially inserting means further includes:

means, responsive to a one of said sections of said leader block retrieval member means having smallest dimension failing to retrieve said leader block of said data storage element loaded into said media drive, for inserting a one of said sections of said leader block retrieval member means having a next larger dimension into said media retrieval arm slot located on said leader block of said data storage element loaded into said media drive.

5. The data storage media identification apparatus of claim 1 wherein said data storage media comprises a magnetic tape, said retrieving means includes:

tape threading arm means for transporting said leader block and said attached magnetic tape along a predefined path over read/write heads to a takeup reel.

6. In a tape drive that reads/writes data on a plurality of different types of magnetic tape media, said magnetic tape media being stored in a magnetic tape cartridge capable of housing one of said plurality of different types of magnetic tape media, and that has an opening in one end thereof for receiving a leader block connected to said magnetic tape media for extracting said magnetic tape media from said magnetic tape cartridge, said leader block having a tape threading arm slot whose dimensions are coded to identify the one of said plurality of different types of magnetic tape that is contained within said magnetic tape cartridge, a magnetic tape media identification apparatus comprising:

tape threading arm pin means having at least two sections, each of dimensions to mate with a corresponding tape threading arm slot enabling said tape threading arm pin means to retrieve said leader block for each of at least two types of said plurality of different types of magnetic tape media;

means, responsive to a cartridge being loaded into said tape drive, for sequentially inserting successive ones of said sections of said tape threading arm pin means into said tape threading arm slot located on said leader block of said magnetic tape media loaded into said tape drive, when an incompatible one of said sections of said tape threading arm pin means fails to engage said tape threading arm slot; and means, responsive to a one of said sections of said tape threading arm pin means mating with said tape threading arm slot located on said leader block of said magnetic tape cartridge loaded into said tape drive, for retrieving said leader block from said magnetic tape cartridge loaded into said tape drive.

7. The magnetic tape media identification apparatus of claim 6 wherein said tape threading arm pin means includes:

cylindrical pin means, having a plurality of coaxially aligned sections, each having a different diameter, each said different diameter being matched for mating with said corresponding tape threading arm slot located on said leader block.

8. The magnetic tape media identification apparatus of claim 6 wherein said sequentially inserting means includes:

means, responsive to a magnetic tape cartridge being loaded into said tape drive, for inserting one of said sections of said tape threading arm pin means having smallest dimension into said tape threading arm slot located on said leader block of said magnetic tape cartridge loaded into said tape drive.

9. The magnetic tape media identification apparatus of claim 8 wherein said sequentially inserting means further includes:

means, responsive to a one of said sections of said tape threading arm pin means having smallest dimension failing to retrieve said leader block of said magnetic tape cartridge loaded into said tape drive, for inserting a one of said sections of said tape threading arm pin means having a next larger dimension into said tape threading arm slot located on said leader block of said magnetic tape cartridge loaded into said tape drive.

10. The magnetic tape media identification apparatus of claim 6 wherein said retrieving means includes:

tape threading arm means for transporting said leader block and said attached magnetic tape along a predefined path over read/write heads to a takeup reel.

* * * * *